(12) United States Patent
Braedt

(10) Patent No.: US 8,066,603 B2
(45) Date of Patent: Nov. 29, 2011

(54) MULTI-SPEED SPROCKET ASSEMBLY

(75) Inventor: Henrik Braedt, Würzburg (DE)

(73) Assignee: SRAM Deutschland GmbH

( * ) Notice: Subject to any disclaimer, the term of this patent is extended or adjusted under 35 U.S.C. 154(b) by 510 days.

(21) Appl. No.: 12/234,367

(22) Filed: Sep. 19, 2008

(65) Prior Publication Data

US 2009/0082147 A1    Mar. 26, 2009

(30) Foreign Application Priority Data

Sep. 21, 2007    (DE) .......................... 10 2007 045 424

(51) Int. Cl.
*F16H 55/30* (2006.01)
*B62M 9/10* (2006.01)

(52) U.S. Cl. ....................................................... 474/160

(58) Field of Classification Search .................. 474/158, 474/160, 152, 153, 156, 161, 224, 229, 230, 474/234

See application file for complete search history.

(56) References Cited

U.S. PATENT DOCUMENTS

| | | | |
|---|---|---|---|
| 4,380,445 A | 4/1983 | Shimano | |
| 5,192,249 A | 3/1993 | Nagano | |
| 5,437,582 A | 8/1995 | Romano | |
| 5,503,598 A | 4/1996 | Neuer | |
| 5,716,297 A | 2/1998 | Bodmer | |
| 6,045,472 A | 4/2000 | Sung et al. | |
| 6,340,338 B1 | 1/2002 | Kamada | |

FOREIGN PATENT DOCUMENTS

| | | |
|---|---|---|
| DE | 24 40 294 A1 | 3/1975 |
| DE | 25 35 943 A1 | 3/1976 |
| DE | 44 18 407 C2 | 11/2002 |
| DE | 601 14 957 T2 | 8/2006 |
| EP | 0689988 A1 | 3/1995 |
| EP | 0642972 A1 | 1/1996 |
| EP | 0945335 | 9/1999 |
| EP | 1238903 | 9/2002 |
| EP | 1 721 823 A2 | 11/2006 |
| EP | 1832503 | 9/2007 |
| GB | 1 482 075 | 8/1977 |

*Primary Examiner* — William E Dondero
(74) *Attorney, Agent, or Firm* — Milan Milosevic; Lisa Serdynski; Steven Courtright

(57) ABSTRACT

A multi-speed sprocket assembly is provided for engaging a bicycle chain displaceable by a derailleur. The multi-speed sprocket assembly generally includes at least one smaller sprocket and at least one larger sprocket. The larger sprocket includes first and second transitional segments for alternatively receiving a shifting chain segment of the bicycle chain shifting from the smaller sprocket to the larger sprocket. The first transitional segment includes a first run-on ramp configured to receive an outer link plate of the shifting chain segment. The first run-on ramp has a first support point configured to bend the transferring bicycle chain at a first angle to position a first chain roller against a no-load tooth flank of the larger sprocket while a second chain roller rests against a load tooth flank of the smaller sprocket. The second transitional segment includes a second run-on ramp configured to receive the outer link plate of the shifting chain segment. The second run-on ramp has a second support point configured to bend the shifting chain segment at a second angle to position the first chain roller against the no-load tooth flank of the larger sprocket while the second chain roller rests against the load tooth flank of the smaller sprocket.

11 Claims, 3 Drawing Sheets

MULTI-SPEED SPROCKET ASSEMBLY

BACKGROUND OF THE INVENTION

The present invention relates to bicycles and more particularly to a multi-speed sprocket assembly including a larger sprocket having first and second support points configured to bend a shifting chain segment at first and second angles, respectively.

Typically, a bicycle having a derailleur shifting system includes a drive multi-speed sprocket assembly, a driven multi-speed sprocket assembly and a chain extending therebetween. The derailleur axially moves or shifts the chain between sprockets. To facilitate the shifting of the chain from a smaller sprocket to a larger sprocket, the sprockets may have teeth missing that form missing-tooth gaps and recesses on a face of the larger sprocket facing the smaller sprocket. However, one disadvantage of providing missing-tooth gaps is that if several missing-tooth gaps are disposed on one sprocket, it cannot be ensured that the chain transitional segments from one sprocket to the other sprocket are identical. For example, if the number of teeth of the larger sprocket, including the missing teeth, is not integer divisible by the difference between the tooth number of the larger sprocket and the adjacent smaller sprocket then, in the case of two missing-tooth gaps on the larger sprocket, at least one missing-tooth gap may not be positioned such that it is optimally offset relative to the smaller sprocket.

The chain transitional segment may be defined as the distance between the contact point of the chain roller on the last tooth of the smaller sprocket and the contact point of the chain roller on the tooth of the larger sprocket that follows the tooth gap. An optimum transitional segment exists when the chain roller on the tooth of the larger sprocket is in an optimum support position (AP) which causes the subsequent chain roller to neither "ride" on a tooth tip of the larger sprocket nor swivel excessively farther from the load tooth flank toward the larger sprocket. An optimum transitional segment ensures smooth shifting of the chain from the smaller sprocket to the larger sprocket.

With an optimum transitional segment, the chain engages the sprockets at three points. One chain roller rests against the last tooth of the smaller sprocket, one chain link plate is laterally supported on the run-on ramp on the larger sprocket and another chain roller rests against the no-load tooth flank in the optimum support position (AP) and makes contact with that tooth of the larger sprocket that follows the missing-tooth gap. If the support position is too high relative to the optimum AP or is displaced in the direction of the tooth tips, a noticeable jerk occurs during the shifting process because the chain roller contacts the larger sprocket to far away from the load tooth flank and jerkily compensates for this distance. If the support position is too deep relative to the optimum AP or displaced in the direction of the tooth base, then the shifting process is delayed. Under high load, in particular, there occurs a "riding" of the chain since the chain rollers slip so far in the direction of load that they no longer engage the larger sprocket, but instead only rest on the tooth tips. At the moment when the smaller sprocket releases the chain, the chain snaps, with strong jerks, into the intermediate space on the larger sprocket or causes the corresponding chain rollers to strike against the load tooth flanks. This may result in overload and increased wear on the corresponding components of the drive train.

SUMMARY OF THE INVENTION

The present invention provides a multi-speed sprocket assembly for engaging a bicycle chain displaceable by a derailleur. The multi-speed sprocket assembly generally includes at least one smaller sprocket and at least one larger sprocket. The larger sprocket includes first and second transitional segments for alternatively receiving a shifting chain segment of the bicycle chain shifting from the smaller sprocket to the larger sprocket. The first transitional segment includes a first run-on ramp configured to receive an outer link plate of the shifting chain segment. The run-on ramp has a first support point configured to bend the shifting chain segment at a first angle to position a first chain roller against a no-load tooth flank of the larger sprocket while a second chain roller rests against a load tooth flank of the smaller sprocket. The second transitional segment includes a second run-on ramp configured to receive the outer link plate of the shifting chain segment. The second run-on ramp has a second support point configured to bend the shifting chain segment at a second angle to position the first chain roller against the no-load tooth flank of the larger sprocket while the second chain roller rests against the load tooth flank of the smaller sprocket.

The multi-speed sprocket assembly facilitates the shifting of the chain from a smaller sprocket to a larger sprocket, especially when the number of teeth of the larger sprocket, including the teeth missing in missing-tooth gaps, is not integer divisible by the difference between the number of teeth of the larger sprocket and the adjacent smaller sprocket, including the missing teeth. When the chain is shifting between sprockets, the shifting chain segment bends at an angle at the support point on the run-on ramp of the larger sprocket. An offset that is not ideal or an excessively short distance of the two roller support points on the smaller and larger sprockets can be corrected by increasing the bend angle of the shifting chain segment. This can be accomplished by displacing the support point of the chain link plate on the run-on ramp. On the one hand, the angle of support is larger when the distance of the support point from the rotation of axis of the sprocket is reduced. On the other hand, the angle of support is smaller when the distance is increased.

In one embodiment of the present invention, the first support point is disposed at a radial position different from the second support point by the first run-on ramp disposed at a radial position different than the second run-on ramp. In another embodiment of the present invention, the first support point is disposed at a radial position different than the second support point by the first run-on ramp configured to be sloped differently than the second run-on ramp. In another embodiment, the first support point is disposed at a radial position different than the second support point by the first run-on ramp configured to be contoured differently than the second run-on ramp. In another embodiment, the first support point is disposed at a radial position different than the second support point by forming a radially-extending recess proximate a missing-tooth base in the missing-tooth gap.

In another embodiment of the present invention, the larger and smaller sprockets include a torque-transmitting profile for mounting the sprockets to a sprocket carrier. In another embodiment, the larger and smaller sprockets include a torque-transmitting profile for coupling to a mating torque-transmitting profile disposed rotatably on a hub axle. In another embodiment, the larger and smaller sprockets forms a single piece with a sprocket carrier rotatable relative to a hub axle. The larger and smaller sprockets may be machined.

These and other features and advantages of the present invention will be more fully understood from the following description of one or more embodiments of the invention, taken together with the accompanying drawings.

DETAILED DESCRIPTION

Figure 1:
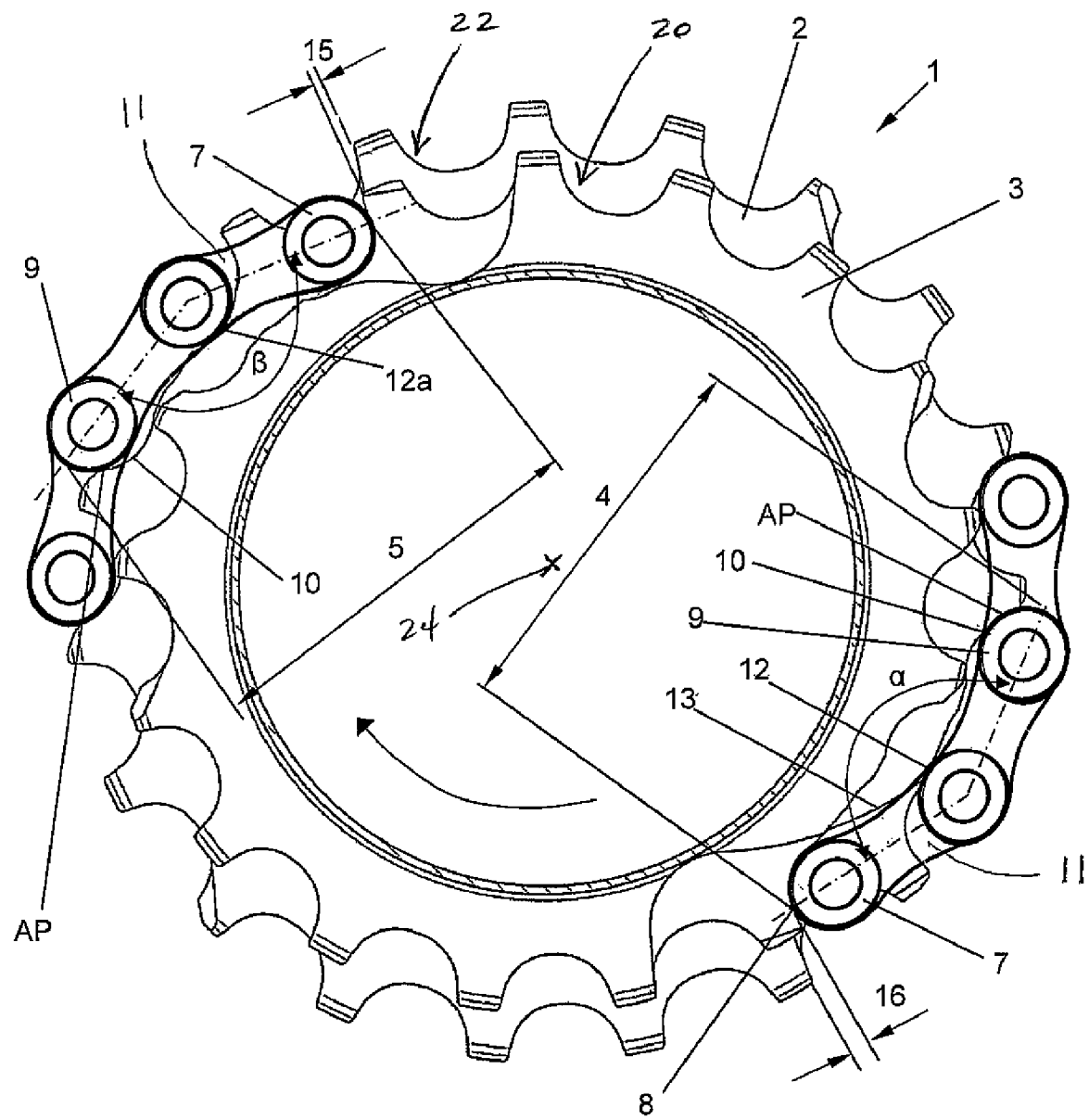
FIG. 1 is a front view of a multi-speed sprocket assembly of the present invention engaging a bicycle chain.

FIGS. 1-4 illustrate a multi-speed sprocket assembly 1 according to one embodiment of the present invention. The multi-speed sprocket assembly 1 includes at least one smaller sprocket 3 having a plurality of teeth 20 and at least one larger sprocket 2 having a plurality of teeth 22. The larger sprocket includes first and second transitional segments 6, 14, for alternatively receiving a bicycle chain shifting from the smaller sprocket 3. Each of the first and second transitional segments 6, 14 include a run-on ramp 13, a missing-tooth gap 26 formed by removing a tooth and a no-load tooth flank 10. The run-on ramp 13 of the first transitional segment 6 includes a first support point 12 and the run-on ramp 13 of the second transitional segment 14 includes a second support point 12a.

FIG. 1 shows the first and second transitional segments 6, 14 receiving shifting chain segments 4, 5, respectively, shifting from the smaller sprocket 3. The first shifting chain segment 4 extends between a second chain roller 7 resting against a load tooth flank 8 of the smaller sprocket 3 and a first chain roller 9 resting against the no-load tooth flank 10 of the larger sprocket. The outer link plate 11 of the chain is supported on the support point 12 of the run-on ramp 13 of the larger sprocket 2. The first shifting chain segment 4 bends at the support portion 12 forming a bend angle α. This shifting process occurs at an ideal offset 16 of the adjacent tooth tips of the larger and smaller sprockets 2, 3. The term "ideal offset" means that the chain roller 9 engages the no-load flank 10 in the optimum support position AP required for proper shifting.

An ideal offset between the adjacent tooth tips of the sprockets 2, 3 does not exist where the second shifting chain segment 5 shifts between the sprockets 2, 3. The offset 15 between adjacent tooth tips of the sprockets is different than the ideal offset 16 between adjacent tooth tips. This results in a longer second shifting chain segment 5 and the corresponding chain roller 9 does not contact the no-load flank 10 in the support position AP that is required for proper shifting. The second shifting chain segment 5 may be stretched so that the optimum support position AP can be achieved at the second shifting chain segment 5 as well. This may be accomplished by radially displacing the second support point 12a in the direction of the rotation of axis 24 of the sprocket. This results in a different bend angle β of the bicycle chain, which is slightly larger than α. As a result, the effective length of the second shifting chain segment 5 can be adapted to the original unfavorable offset on the second shifting chain segment 5 by effecting a correction in the radial displacement of the second support point 12a. The effective length of the second shifting chain segment 5 thus differs from that of the first shifting chain segment 4.

Figure 2:
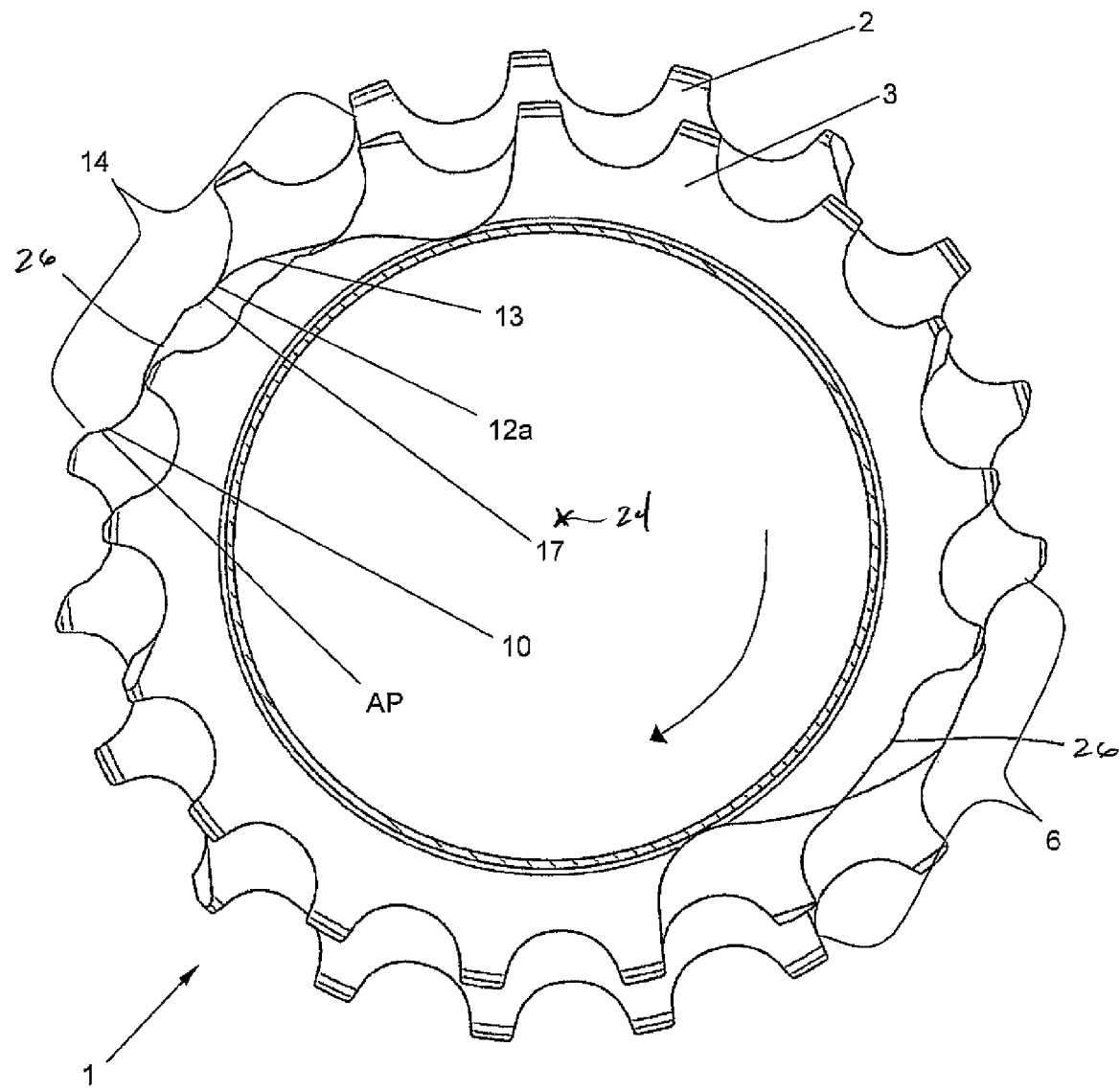
FIG. 2 is a front view of the multi-speed sprocket assembly of FIG. 1.

Looking to FIG. 2, the larger and smaller sprockets 2, 3 include the first and second transitional segments 6 and 14, respectively. The number of teeth 22, including the missing teeth, of the larger sprocket 2 are integer indivisible by the difference between the number of teeth 22, 20 of the larger and smaller sprocket 2, 3. This configuration creates an offset that permits a shock-free shifting for only one of the first and second transitional segments 6, 14. To achieve an optimum support position AP of a chain roller on the no-load flank 10 on the second transitional sprocket segment 14, the second support point 12a on the run-on ramp is displaced by a radially-extending recess 17 in the direction of the sprocket axis 24. This correction in the radial displacement causes the shifting chain segment 14 to stretch and the corresponding chain roller 9 to engage at the optimum support position AP.

Figure 3:
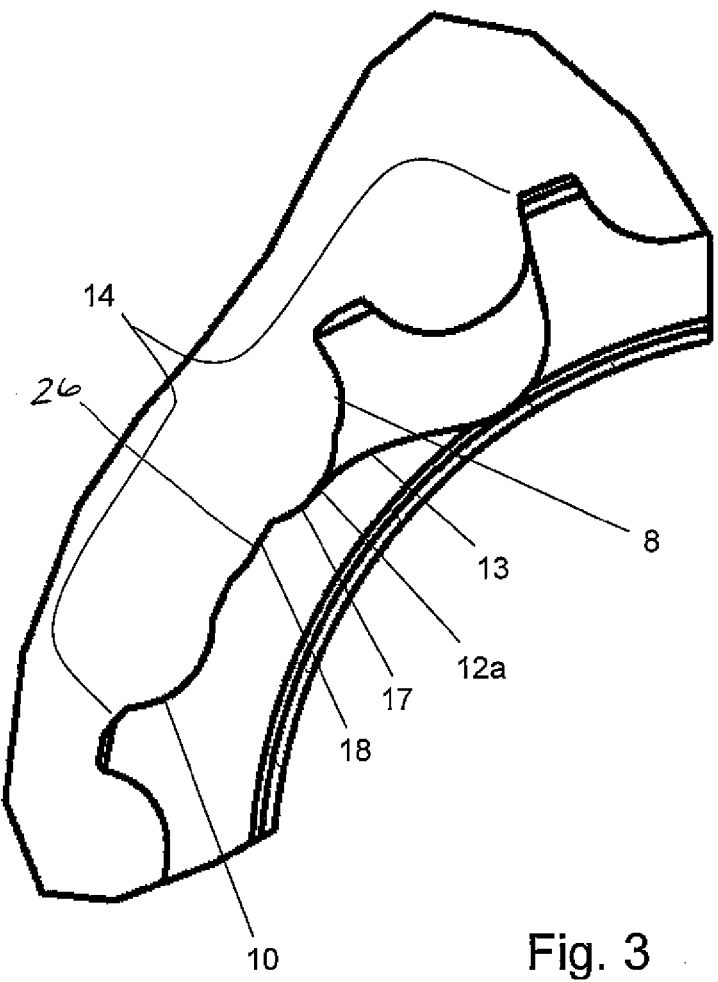
FIG. 3 is a partial front view of the multi-speed sprocket assembly of FIG. 1.

FIG. 3 shows an enlarged section of the multi-speed sprocket assembly 1 including the run-ramp 13 and the transitional segment 14 or missing-tooth gap. The missing-tooth gap 26 is disposed between the no-load flank 10 and a load flank 8. The radially-extending recess 17 is disposed in the region of the load flank 8 and proximate a tooth base 18 of the second transitional segment 14. The recess 17 displaces the second support point 12a that receives the corresponding chain link plate 11 in the direction of the sprocket axis 24, thereby improving the conditions for shifting.

Figure 4:
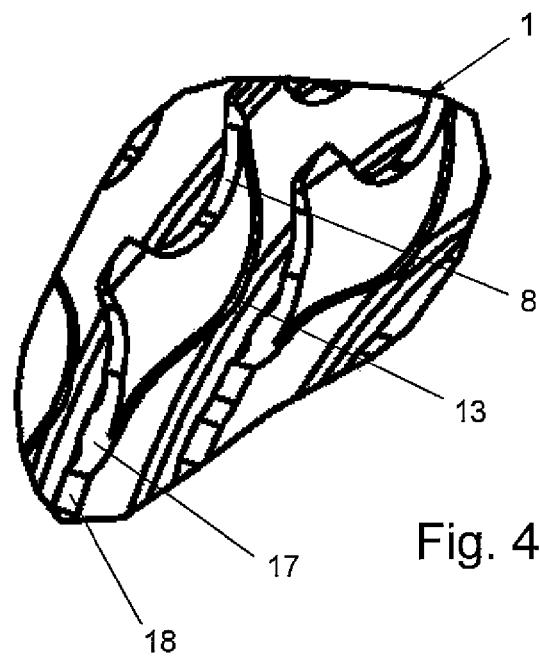
FIG. 4 is a partial top view of the multi-speed sprocket assembly of FIG. 1.

FIG. 4 shows an enlarged section of the multi-speed sprocket assembly 1 including a plurality of sprockets. The second transitional segment 14 and the radially-extending recess 17 are disposed on the larger sprocket. This recess 17 in the region of the load flank 8 is deeper than the tooth base 18 and radially displaces the support point of the outer link plate on the run-on ramp in the direction of the sprocket axis 24.

While this invention has been described by reference to one or more embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A multi-speed sprocket assembly for engaging a bicycle chain displaceable by a derailleur comprising:
   at least one smaller sprocket; and
   at least one larger sprocket including first and second transitional segments for alternatively receiving a shifting chain segment of the bicycle chain shifting from the smaller sprocket to the larger sprocket,
   the first transitional segment including a first run-on ramp configured to receive an outer link plate of the shifting chain segment, the first run-on ramp having a first support point configured to bend the shifting chain segment at a first angle to position a first chain roller against a no-load tooth flank of the larger sprocket while a second chain roller rests against a load tooth flank of the smaller sprocket,
   the second transitional segment including a second run-on ramp configured to receive the outer link plate of the shifting chain segment, the second run-on ramp having a second support point configured to bend the shifting chain segment at a second angle to position the first chain roller against the no-load tooth flank of the larger sprocket while the second chain roller rests against the load tooth flank of the smaller sprocket.

2. The multi-speed sprocket assembly of claim 1 wherein the first support point is disposed at a radial position different than the second support point by the first run-on ramp disposed at a radial position different than the second run-on ramp.

3. The multi-speed sprocket assembly of claim 1 wherein the first support point is disposed at a radial position different than the second support point by the first run-on ramp configured to be sloped differently than the second run-on ramp.

4. The multi-speed sprocket assembly of claim 1 wherein the first support point is disposed at a radial position different than the second support point by the first run-on ramp configured to be contoured differently than the second run-on ramp.

5. The multi-speed sprocket assembly of claim 1 wherein one tooth is omitted in at least one of the first and second transitional segments to form a missing-tooth gap having a missing-tooth base.

6. The multi-speed sprocket assembly of claim 5 wherein the first support point is disposed at a radial position different than the second support point by forming a radially-extending recess proximate the missing-tooth base.

7. The multi-speed sprocket assembly of claim 6 wherein the number of teeth on the larger sprocket, including the missing teeth, is not integer divisible by the difference between the tooth number of the larger sprocket and the smaller sprocket, including the missing teeth.

8. The multi-speed sprocket assembly of claim 1 wherein the larger and smaller sprockets include a torque-transmitting profile for mounting the sprockets to a sprocket carrier.

9. The multi-speed sprocket assembly of claim 1 wherein the larger and smaller sprockets include a torque-transmitting profile for coupling to a mating torque-transmitting profile disposed rotatably on a hub axle.

10. The multi-speed sprocket assembly of claim 1 wherein the larger and smaller sprockets form a single piece with a sprocket carrier rotatable relative to a hub axle.

11. The multi-speed sprocket assembly of claim 1 wherein the larger and smaller sprockets are machined.

\* \* \* \* \*